US007636364B2

(12) United States Patent
Fotedar

(10) Patent No.: US 7,636,364 B2
(45) Date of Patent: Dec. 22, 2009

(54) REDUNDANT ROUTER NETWORK

(75) Inventor: Shivi Fotedar, San Jose, CA (US)

(73) Assignee: Force 10 Networks, Inc., San Jose, CA (US)

( * ) Notice: Subject to any disclaimer, the term of this patent is extended or adjusted under 35 U.S.C. 154(b) by 1171 days.

(21) Appl. No.: 10/286,957

(22) Filed: Oct. 31, 2002

(65) Prior Publication Data

US 2004/0085965 A1 May 6, 2004

(51) Int. Cl.
*H04L 12/28* (2006.01)
*H04L 12/66* (2006.01)
*G06F 9/34* (2006.01)
*G06F 15/173* (2006.01)

(52) U.S. Cl. ....................... 370/401; 370/409; 370/469; 709/238; 711/203

(58) Field of Classification Search ................. 370/401, 370/409, 469; 709/238; 711/203
See application file for complete search history.

(56) References Cited

U.S. PATENT DOCUMENTS 5,917,997 A * 6/1999 Bell et al. ...................... 714/4
6,556,547 B1 * 4/2003 Srikanth et al. ............. 370/317
6,785,273 B1 * 8/2004 Verma ........................ 370/389
6,788,681 B1 * 9/2004 Hurren et al. ............... 370/389
6,885,667 B1 * 4/2005 Wilson ....................... 370/392
6,954,436 B1 * 10/2005 Yip et al. .................... 370/254
6,977,890 B2 * 12/2005 Oohashi et al. ............. 370/228
6,981,174 B1 * 12/2005 Hanning ........................ 714/5
7,027,396 B1 * 4/2006 Golan et al. ................ 370/232
7,072,346 B2 * 7/2006 Hama .................... 370/395.53
7,092,354 B2 * 8/2006 Jensen ........................ 370/218
7,293,077 B1 * 11/2007 Teo et al. .................... 709/221
2002/0021689 A1 * 2/2002 Robbins et al. ............. 370/352
2002/0067725 A1 * 6/2002 Oguchi et al. ............... 370/390
2002/0184387 A1 * 12/2002 Yamaya et al. .............. 709/238
2002/0186698 A1 * 12/2002 Ceniza ....................... 370/401
2003/0051048 A1 * 3/2003 Watson et al. ............... 709/238

* cited by examiner

*Primary Examiner*—Alpus H Hsu
(74) *Attorney, Agent, or Firm*—Robert Schuler

(57) ABSTRACT

A networking system including virtually addressed devices is described. A network device has one or more virtual addresses assigned to its loopback interface. Once so assigned and the loopback interface enabled, data and commands directed to any of the assigned virtual addresses is sent through the device's protocol stack. The device is then structured to act on the data and commands destined for the virtual address.

7 Claims, 2 Drawing Sheets

100

CREATE VIRTUAL ROUTER — 110
ASSIGN IP ADDRESS TO LOOPBACK ADDRESS OF ROUTER — 120
SET ROUTER PRIORITY — 130
SET PRE-EMPTION — 140
SET AUTHENTICATION — 150
SET ADVERTISEMENT VALUE — 160
SET TRACKING — 170

REDUNDANT ROUTER NETWORK

TECHNICAL FIELD

This disclosure relates to a system for network processing, and, more specifically, to a network system that can interact directly with redundant routers using virtual addressing.

BACKGROUND

A router is a network device that connects a host computer on a first network to a computer on a second, similar type network. Previously, routers on Internet Protocol (IP) networks had static physical addresses, and the host would send data packets to the static addresses of the router to be forwarded to the destination network. It was inconvenient when routers failed, because the host would either have to be reprogrammed to send data to a different router, or a new router would have to be programmed to have the same static address of the old router. Doing either of these tasks was relatively time consuming and, until complete, the host could not communicate with the desired second network, thus interrupting data traffic between the host and the second network.

Virtual routing was developed to ameliorate the above problem. In virtual routing, two or more physical routers provide support for a single "virtual" router address. One physical router is deemed the master, and has primary responsibility for routing data sent to a virtual router address. If for some reason the master router should fail, a slave, which is a second physical router, automatically takes over responsibility for routing the data sent to the virtual router address.

For example, in FIG. 1 a host computer is assigned IP address 10.10.10.1 and is located on a local subnet 10.10.10.0/24. If the host computer desires to communicate with a computer not on the local subnet, it must send data packets through a router. In FIG. 1, a virtual router is assigned the IP address 10.10.10.2. A router 1 is the master for the virtual router, and has a physical address of 10.10.10.3. A router 2 is the slave for the virtual router and has the physical address 10.10.10.4. In normal operation, router 1 performs the actual data routing for the virtual router by routing data sent by the host to the virtual router address 10.10.10.2. If, for some reason router 1 becomes inoperative, router 2 automatically takes over the routing responsibilities of the virtual router from the disabled router 1. When the slave is active, it routes the data sent by the host to the virtual address 10.10.10.2. Note that even when different physical routers handled the routing functions, the host still sent data to 10.10.10.2, and did not have to be modified when the primary router went down. A protocol, Virtual Router Redundancy Protocol (VRRP), is responsible for ensuring that the master/slave relation and switchovers occur without problem.

Although the VRRP switching is a relatively robust technology, it creates another problem in network communications. Specifically, although the host computer can send data through a virtual router using the virtual address, it cannot send data or commands to the virtual router address directly. Instead, to send data or commands to the router presently posing as the virtual router, the host must know the physical address of the router currently acting as the virtual router. Thus, with reference to FIG. 1, the host could send a ping or some other command to either of the physical routers 10.10.10.3 or 10.10.10.4, but any command sent directly to the virtual address of 10.10.10.2 simply goes unanswered.

This is a serious limitation for a network manager or architect who oftentimes needs to verify that the hardware on the computer network is working properly. Typically, a network troubleshooter would send ping or traceroute commands to test and verify that the network hardware is correctly operating. However, in present virtual routing systems, receiving useful information in response to such commands sent to a virtual router is presently not possible.

The present invention addresses these and other problems associated with the prior art.

DETAILED DESCRIPTION OF PREFERRED EMBODIMENTS

Embodiments of the invention create an association between one or more virtual addresses and a loopback interface of a networked device. Once the virtual addresses are assigned to the loopback interface, any commands addressed to one of the assigned virtual addresses proceeds through the loopback of the network device and is acted upon by the protocol stack. Thus, commands that produce valuable feedback information, like "ping" and "traceroute" can be sent directly to the virtual router address, and acted on by the physical machine currently serving as the virtual router.

Embodiments of the invention use the virtual IP address as a modified "static route". Static routes can be created regardless of which subnet the virtual IP address belong to. However, a router having a standard static route doesn't "own" the route, and hence cannot accept traffic destined for that static address.

Instead of pointing the static route to an interface or IP address of a neighboring router (as static routes are created), the static route is pointed to the internal loopback address 127.x.x.x. IP addresses beginning with 127 are reserved on all machines to be used for testing the machine itself. Frequently the loopback address is given as 127.0.0.1. This address tells the router that any IP packets destined for the virtual IP address should be sent to "itself", and passed up into the IP stack of the machine to be handled by an application running on the machine itself. For instance, if packets making up a ping command arrive destined for the virtual router address, the physical router presently serving as the virtual router will send the packets to its own loopback address. Then, the IP stack of the router will pass them up to the ping application running on the router itself, rather than forwarding them out of the router. When the ping application sees the ping command, it responds back as it normally would, by placing its address in the ping payload and sending notice back to the source that sent the ping command. Embodiments of the invention could operate by either sending the virtual address back as the payload data, or the physical address of the router acting as the virtual router could be placed in the payload instead.

The static route can be pointed to the internal loopback address when the router is initially being set up to be a virtual router, or, the static route can be modified dynamically when a slave router becomes the master router after the master router fails, for instance.

Figure 1:
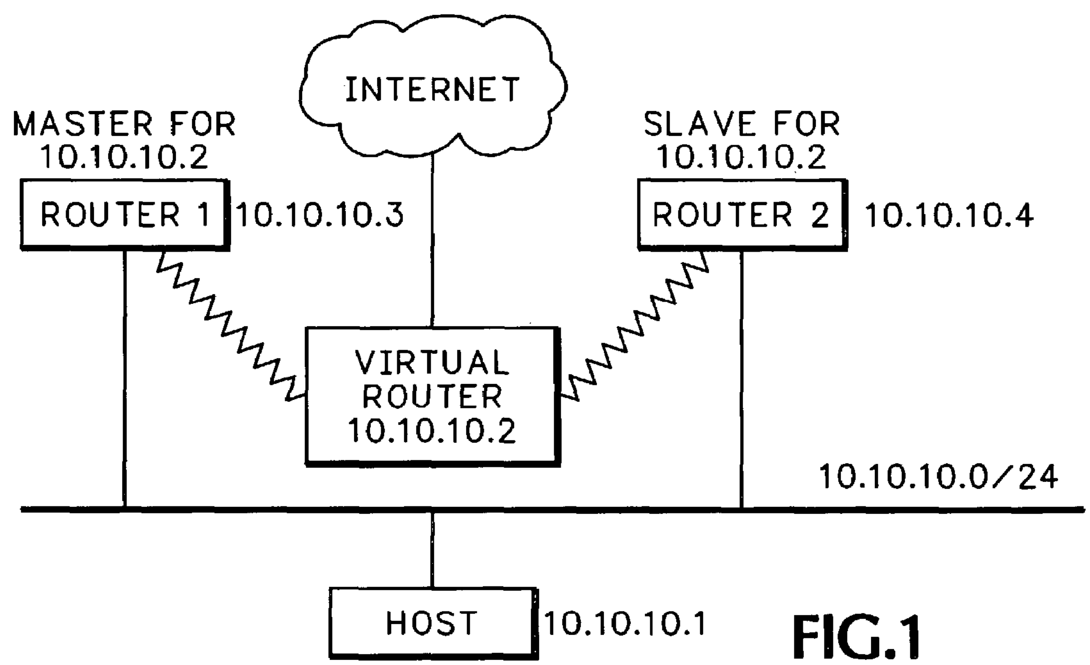
FIG. 1 is a block diagram of a network device according to the prior art.
Figure 2:
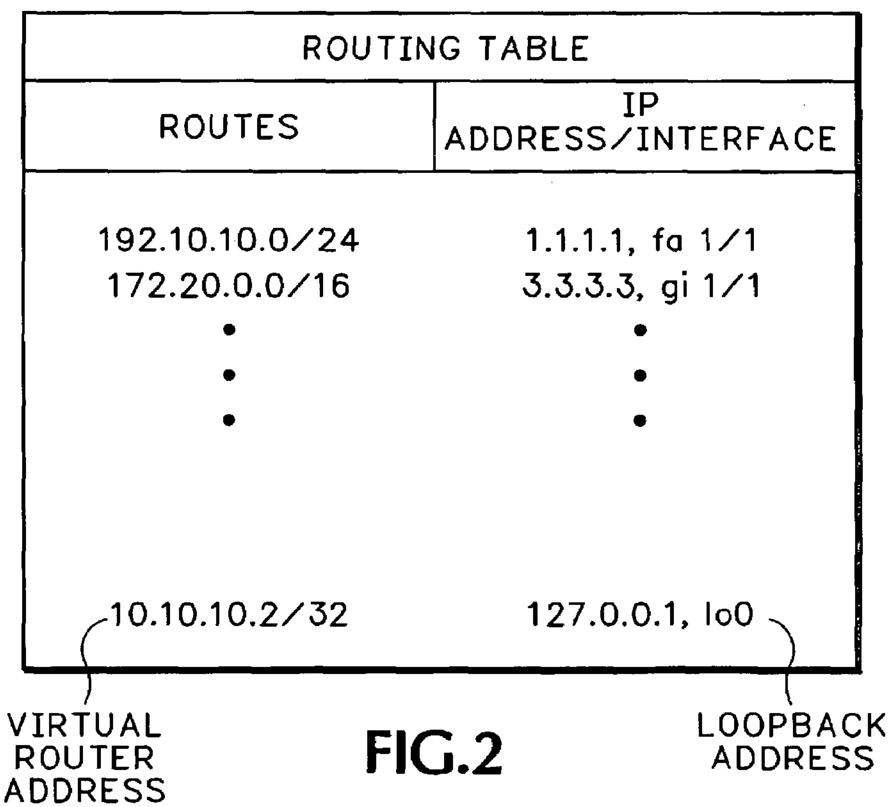
FIG. 2 is a sample static route table for a virtual router network according to an embodiment of the invention.

FIG. 2 shows a sample static routing table 10 for a router configured as a virtual router according to an embodiment of the invention. Illustrated in the left column is the destination IP address. Illustrated in the right column is the address of the interface within the router, or the IP address of the neighboring router to which data sent to the destination IP address is sent. Note that packets sent to the IP address of the virtual router, 10.10.10.2, are statically referenced to the loopback address of 127.0.0.1.

Assigning a Host Address to Machine

Embodiments of the invention, by routing packets destined for a particular address to the machine itself by using the loopback address, act similar to a "host" using host addressing. Specifically indicating that IP commands sent to the virtual address should be acted on by the physical router presently acting as the virtual router is similar to indicating that a particular machine is a host. Commands or programs can be performed on the router from another machine, such as telnet. Or, the router ID could be used for protocols, such as OSPF (Open Shortest Past First), ISIS (Intermediate System to Intermediate System) or BGP (Border Gateway Protocol).

In routers according to the prior art, OSPF picks up the IP addresses assigned to specific interfaces within the router as a router ID. Using embodiments of the invention, an IP address (the virtual IP address) is assigned to the router itself, rather than a specific interface. One advantage to this procedure is that, if any specific interface should fail, the OSPF process need not be reset to operate correctly. In other words, because an IP address can be assigned to a router, and is not limited to being assigned to a single interface, as long as the router itself is operational, then the IP address will always be available to the OSPF process.

Setting up the VRRP Network

Figure 3:
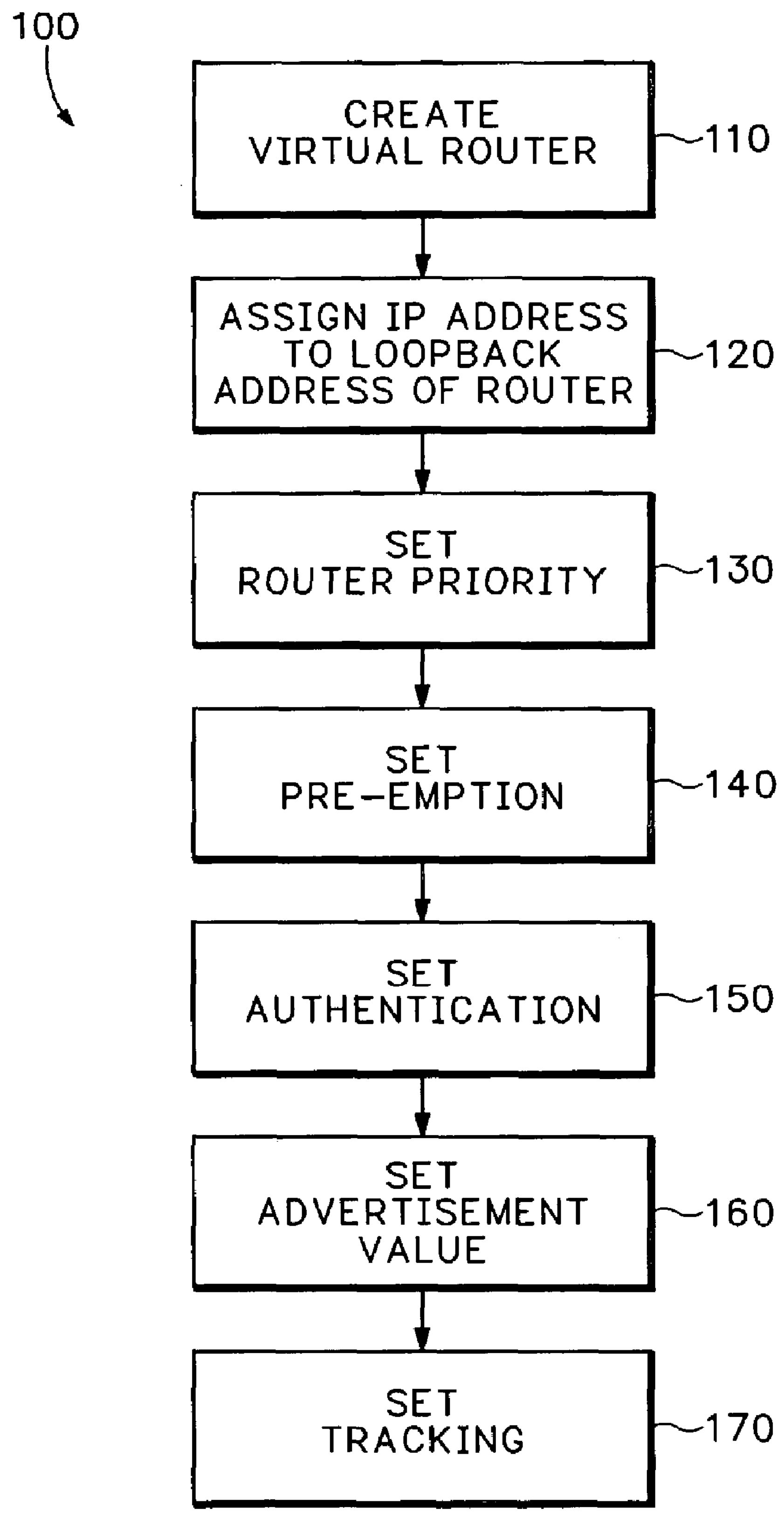
FIG. 3 is an example flow diagram illustrating processes that can be used to set up a VRRP network according to embodiments of the invention.

FIG. 3 illustrates processes 100 used in establishing and configuring a VRRP network. In a first process 110, a virtual router is defined by first creating an identification number for the virtual router. Typically, this is performed at the interface level, i.e. for a particular interface in the router. A sample command to assign the identification number to the particular interface is "vrrp-group vrid", where vrid is the identification number for the virtual router. Conversely, to delete an identification number from the interface, the command "no vrrp-group vrid" is used.

Virtual routers contain virtual IP addresses configured for that VRRP group, in addition to other configuration information. In some embodiments of the invention, a VRRP group is unable to transmit VRRP packets until a virtual IP addresses is assigned to the virtual group id. To activate a VRRP group on an interface, which will cause the VRRP group to start transmitting IP packets, an IP number is assigned to the IP group, as illustrated in process 120. A sample command is "virtual-address ip-address1[ip-address2] . . . [ip-address12] ", where ip-address is the IP address of the virtual routers, and does not include the IP address mask. In some embodiments of the invention, as illustrated above, up to 12 virtual ip-addresses can be configured for a VRRP group.

In some cases it is beneficial to set priorities for the VRRP group. One benefit to setting priorities is to indicate which physical router interface takes the master role for the virtual router. In other words, the router that is configured to be the master router will take over primary responsibility for routing packets addressed by the host to the virtual router. If, for some reason, the master router should fail, one or more slave routers take responsibility for the virtual router. Setting the priorities allows the network architect to determine in which order the routers in the VRRP will assume the virtual routing role. Setting the priority is illustrated as process 130, and, in some embodiments, can be accomplished with the command "priority priority" where the priority number is a number between 1 and 255. If no priority is specifically set for a router, its default priority is 100.

In some cases, it is desirable to force the master router to automatically defer to another router that comes on the network having a higher priority than the current master router. A command to enable such preemption is illustrated as process 140 and can be accomplished with the command "preempt". To turn off preemption, a command "no preempt" is entered. In some embodiments, the preemption command is turned on by default.

Setting simple authentication of VRRP packets ensures that only trusted routers participate in VRRP processes. When authentication is enabled, a password is included in the VRRP packets and a receiving router uses the password to verify the transmission. Setting authentication is illustrated as process 150, and, in some embodiments, can be accomplished with the command "authentical-type simple [encryption type] password", where encryption type identifies how the password is encrypted, and password is the password itself.

In the VRRP network, the currently operating master router advertises to all of the members of the VRRP group that it is running as the master router. If the VRRP group does not receive an advertisement, then an election process begins and the backup virtual router having the highest priority (after the disabled master) transitions to the master. In some embodiments, it may be beneficial to change the advertisement time, as illustrated as process 160. In some embodiments, the command can be implemented as "advertise-interval seconds" where seconds indicates the number of seconds between master router advertisements. The default can be set to be one, for example, and to have an overall range of between 1-255.

In some embodiments it may be beneficial to monitor an interface used by a virtual group. The virtual group sends VRRP packets out from the interface and, if the interface is disabled or shutdown, the VRRP packets are not transmitted. With tracking enabled, embodiments of the invention can lower the priority of the VRRP group(s) on that interface if the interface is disabled or goes down. The lowered priority of the VRRP group may trigger an election for a new master router. To track an interface, as illustrated in process 170, a command can be given such as "track interface [priority-cost cost]", where interface indicates which interface is in the particular VRRP, and priority-cost is a value to be subtracted from the group priority should the interface go down. The priority cost can have a value of, for instance, 1-255, with a default of 10.

Described herein is only a sample system which may look much different than an actual system in implementation. The system described above can use dedicated processor systems, micro controllers, programmable logic devices, or microprocessors that perform some or all of the processing and routing functions. Some of the operations described above may be implemented in software and other operations may be implemented in hardware.

Of course there can be many or few routers in the VRRP network and many or few interfaces within each router. Additionally, not all of the processes shown in FIG. 3 need to be set up in all cases. In some embodiments, default values can be assigned. As always, implementation is left to the system designer, and many of the specific details may be best determined empirically.

For the sake of convenience, the operations are described as various interconnected functional blocks or distinct modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A virtual routing network, comprising:

a static routing table in a network communication device coupled to the virtual routing network;

an entry in the static routing table assigning a virtual routing address to a loopback address of the network communication device; and an IP protocol stack on the network communication device, wherein the network communication device passes packets destined for the virtual routing address to the IP protocol stack.

2. The virtual routing network of claim 1 wherein the virtual routing address is a virtual IP address.

3. The virtual routing network of claim 1, further comprising:

one or more applications operating on the network communication device and structured to operate on the IP protocol stack, wherein the network communication device passes payloads of packets destined for the virtual routing address to the one or more applications structured to process those particular payloads.

4. The virtual routing network of claim 1, further comprising:

a second network communication device coupled to the network communication device, the second network communication device including a static routing table having an entry assigning the virtual routing address to a loopback address of the second communication device.

5. The virtual routing network of claim 4 wherein at any given time, only one of the network communication device and the second network communication device is structured to operate on commands destined for the virtual routing address.

6. The virtual routing network of claim 1 wherein the network is a Virtual Router Redundancy Protocol (VRRP) network.

7. The virtual routing network of claim 1 wherein the network communication device is structured to operate on commands destined for the virtual routing address.

* * * * *